(12) United States Patent
Boekhorst

(10) Patent No.: US 7,532,751 B2
(45) Date of Patent: *May 12, 2009

(54) APPARATUS AND COMPUTER READABLE MEDIUM FOR SETTING UP MULTI-DIMENSIONAL DDA VARIABLES

(75) Inventor: Martijn Boekhorst, Nieuwegein (NL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/043,271

(22) Filed: Mar. 6, 2008

(65) Prior Publication Data

US 2008/0212872 A1    Sep. 4, 2008

Related U.S. Application Data

(63) Continuation of application No. 10/779,384, filed on Feb. 13, 2004, now Pat. No. 7,366,345.

(30) Foreign Application Priority Data

Feb. 28, 2003   (GB) .................................. 0304570.5

(51) Int. Cl.
    *G06K 9/00* (2006.01)
(52) U.S. Cl. ........................ 382/154; 345/419; 708/102

(58) Field of Classification Search .................. 382/154, 382/278; 345/419, 443, 441, 611, 418, 589, 345/424, 421; 708/831, 821, 422, 290, 102, 708/103; 381/573, 182, 300, 386
See application file for complete search history.

(56) References Cited

U.S. PATENT DOCUMENTS 7,366,345 B2 *   4/2008   Boekhorst .................... 382/154

OTHER PUBLICATIONS

L. Szirmay, "Theory of Three Dimensional Computer Graphics", Chapter 2, pp. 25-52. Sep. 1995.
A. Fujumoto et al., "ARTS: Accelerated Ray-Tracing System", IEEE CG&A, Apr. 1986, pp. 16-26.

* cited by examiner

*Primary Examiner*—Sheela C Chawan
(74) *Attorney, Agent, or Firm*—Christopher & Weisberg, P.A.

(57) ABSTRACT

An apparatus and a computer program product render a multi-dimensional digital image using raytracing in a multi-dimensional space. A multi-dimensional digital differential analyzer (DDA) is included. Variables of said multi-dimensional digital differential analyzer (DDA) are set up using multiplications only. The digital image is rendered based upon the variables of the multi-dimensional digital differential analyzer (DDA). Each axis of the multi-dimensional space includes a numerator which holds the progress within a cell along that axis and a denominator which describes a size condition causing said DDA to step to a next cell.

14 Claims, 4 Drawing Sheets

PSEUDOCODE 300

The direction of a ray is Vector V
The origin of the ray is Vector B
Let the coordinates of the cell that is started with in be Trunc(B*S) for all axes S.

310 {
```
For all axes Q {
        DenQ is the multiplication sequence of the deltas of all axes other than Q If vector V is positive along the Q axis {
                NumQ = (1 - Fract(B*Q)) * DenQ
        }
        Else {
                NumQ = Fract(B*Q) * DenQ
        }
}
```
}

```
While (forever) {
        With Q, the axis whose Numerator is smallest of all axes, do {
                For all axes R where R ≠ Q {
                        NumR = NumR – NumQ
                }

NumQ = DenQ
                Perform step into the cell adjacent to this one on axis Q,
                in the direction of V*Q
        }
}
```

FIG. 3

PSEUDOCODE

Instantiating pseudocode 300 for 2D case:

The direction of a ray is Vector V
The origin of the ray is Vector B
Let the coordinates of the cell that is started with in be Trunc(B•S) for all axes S.

DenX = y-delta;
DenY = x-delta;

If vector V is positive along the Q axis
    NumX = (1 - Fract(B•X)) * DenX
Else
    NumX = Fract(B•X) * DenX If vector V is positive along the Y axis
    NumY = (1 - Fract(B•Y)) * DenY
Else
    NumY = Fract(B•Y) * DenY

```
While (forever) {
        If (NumX < NumY) {
                NumY = NumY - NumX
                NumX = DenX
                Step into the next horizontal cell if V•X is positive, or
                the previous horizontal cell if V•X is negative.
        }
        else {

NumX = NumX - NumY
                NumY = DenY
        Step into the next vertical cell if V•Y is positive, or
        the previous vertical cell if V•Y is negative.
        }
}
```

FIG. 5

APPARATUS AND COMPUTER READABLE MEDIUM FOR SETTING UP MULTI-DIMENSIONAL DDA VARIABLES

CROSS-REFERENCE TO RELATED APPLICATION

This application is a continuation of patent application Ser. No. 10/779,384, filed Feb. 13, 2004, entitled METHOD OF SETTING UP MULTI-DIMENSIONAL DDA VARIABLES, which claims priority to United Kingdom Application Serial No. 0304570.5, filed Feb. 28, 2003, the entireties of both of which are incorporated herein by reference.

STATEMENT REGARDING FEDERALLY SPONSORED RESEARCH OR DEVELOPMENT n/a

FIELD OF THE INVENTION

The present invention relates generally to computer graphics and, in particular, to methods and engines for rendering a digital image using raytracing.

BACKGROUND OF THE INVENTION

Raytracing is a field of computer graphics that can produce superior, photorealistic digital images. Raytracing or raycasting is a three-dimensional (3-D) rendering technique that determines the location of an object in 3-D and calculates shadows, reflections, and hidden surfaces based on lighting conditions and locations, as well as material characteristics. The visibility of surfaces is determined by tracing rays of light from the viewer's vantage to objects in a scene.

Raytracing differs from z-buffer oriented methods by being ray centric, as opposed to primitive centric. Instead of drawing primitives to a screen, rays are cast from a virtual eye, or center of projection, through screen pixels (i.e., a view plane) to find intersecting primitives for those pixels. Each pixel has a color set to that of the primitive at the closest point of intersection. While raytracing has existed for quite some time, only recently has research started to make raytracing algorithms run in realtime. Current applications for raytracing include movie and advertising business for precalculated visualizations.

Interactive and realtime raytracing are closely related areas, but are not quite the same. "Interactive" refers to the ability to compute scenes at realtime speeds, without prior knowledge of future frames (e.g., a user may be able to control scene content directly). "Realtime" refers to the ability to compute scenes at speeds sufficiently high to convey the perception of motion to the human eye and allowing an algorithm with knowledge of future frames (more of a prescripted movie approach to animation).

A major limitation on the application of raytracing is the significant computational requirements incurred to render images. A number of proposals have been made to increase the efficiency of raytracing to expand its use in computer graphics. A number of algorithms and architectures for image generation are described by Szirmay-Kalos, László, *Theory of Three Dimensional Computer Graphics*, Chp. 2, pp. 25-52. In particular, Szirmay-Kalos describes a Digital Differential Analyzer (DDA) line generator used to generate pixel data by applying an incremental concept to scan-line conversion. For a linear function, a line can be drawn using the DDA that eliminates multiplication, non-integer addition, and round operations. The slope of a line is calculated once and is then used to incrementally determine or generate the line.

Fujimoto, A., Tanaka, T., and Iwata, K., "ARTS: Accelerated Ray-Tracing System", *IEEE CG&A*, April 1986, pp. 16-26 describe a three-dimensional digital differential analyzer (3DDDA) that seeks to address issues of speed and aliasing in ray-tracing. The 3DDDA is a 3D line generator for traversing a data structure describing a 3-D environment to identify the intersections between rays and objects in the image to be generated. The 3DDDA identifies cells pierced by a ray or straight line and generates the coordinates of the cells. One implementation of a 3DDDA is to use two DDAs synchronized to work in mutually perpendicular planes that intersect along a driving axis DA (i.e., a coordinate axis). In each plane, the respective DDA follows the projection of the 3-D line onto that plane. The coordinate corresponding to the driving axis DA of each DDA is unconditionally incremented by one unit, where the DA is determined by the slope of the line. A control term (or error term) for each DDA measured perpendicular to the DA is updated; this is done by subtracting from the control term the slope value and determining if it satisfies a stipulated condition. Both control terms are measured against the same DDA. If the test fails, a unit increment or decrement of the coordinate perpendicular to the DA is performed for the DDA. The control term is corrected by adding the value corresponding to one pixel whenever underflow occurs.

Setup of a 3DDDA is a significant limitation of the 3DDDA. In particular, the setup involves the following parameters:

$DX = C/x\text{-delta}$, $DY = C/y\text{-delta}$, and $DZ = C/z\text{-delta}$, where C is a constant value (e.g., 1 if floating point) and x-delta, y-delta and z-delta components are the absolute coordinates of the vector to be traced through a grid (e.g., for a vector (−1, 23, 4) the x-delta is abs(−1)=1 and y-delta is (abs(23)=23). Disadvantageously, a division is incurred per ray cast. That is, three divisions are incurred for the 3D case. Divisions are computationally costly.

Thus, a need clearly exists for an improved method of ray-tracing using a multi-dimensional DDA that reduces computation time.

SUMMARY OF THE INVENTION

In accordance with a first aspect of the invention, there is provided an apparatus and computer program product for rendering a multi-dimensional digital image using raytracing in a multi-dimensional space. The apparatus comprises a multi-dimensional digital differential analyzer (DDA), means for setting up variables of said multi-dimensional digital differential analyzer (DDA) using multiplications only, and means for rendering the digital image based upon the variables of the multi-dimensional digital differential analyzer (DDA). For each axis of the multi-dimensional space, a numerator holds the progress within a cell along that axis and a denominator describes a size condition causing the DDA to step to a next cell. For a 2D vector, a denominator of the vector for one axis is equal to: a delta for a vector component of the other axis. Otherwise, the denominator is equal to a product of deltas for all vector components, excluding the component of said axis, for greater than two dimensions. The multi-dimensional space may be two dimensional (2D) space and the denominators may be DenX=y-delta, and DenY=x-delta. Further, the multi-dimensional space may be three dimensional (3D) space and the denominators may be DenX=y-delta*z-delta, DenY=x-delta*z-delta, and DenZ=x-delta*y-delta.

For a vector V, a numerator of the vector V for an axis Q may be initially equal to:

(1−Fract(B·Q))*DenQ, if the vector V is positive along the Q axis; and

Fract(B·Q)*DenQ, otherwise.

The apparatus may further include means for tracing the vector dependent upon the initial values of the numerators and denominators for all axes of the vector. The tracing step may comprise, until the vector is traced, repeatedly applying the steps of: determining an axis having a numerator that is smallest for all axes; for all axes other than the determined axis, calculating a new numerator value for each of the axes equal to a current value of the numerator minus the numerator of the determined axis; setting the numerator of the determined axis equal to the denominator of the determined axis; and stepping into a cell adjacent to the cell on the determined axis, in the direction of the dot product of the vector and the determined axis.

In accordance with another aspect, the present invention provides a computer program product having a computer program recorded thereon for rendering a multi-dimensional digital image using raytracing in a multi-dimensional space. When executed, the computer program product sets up variables of a multi-dimensional digital differential analyzer (DDA) using multiplications only. The computer program product also renders the digital image based upon the variables of the multi-dimensional digital differential analyzer (DDA). Each axis of said multi-dimensional space includes a numerator which holds the progress within a cell along that axis, and a denominator which describes a size condition causing said DDA to step to a next cell.

BRIEF DESCRIPTION OF THE DRAWINGS

A number of embodiments of the invention are described hereinafter with reference to the drawings, in which:

FIG. 3 is a pseudocode listing illustrating a multi-dimensional DDA algorithm or process in accordance with an embodiment of the invention;

FIG. 5 is a pseudocode instantiation 500 of the pseudocode 300 of FIG. 3 for the two-dimensional DDA algorithm in accordance with another embodiment of the invention.

DETAILED DESCRIPTION OF THE INVENTION

Figure 1:
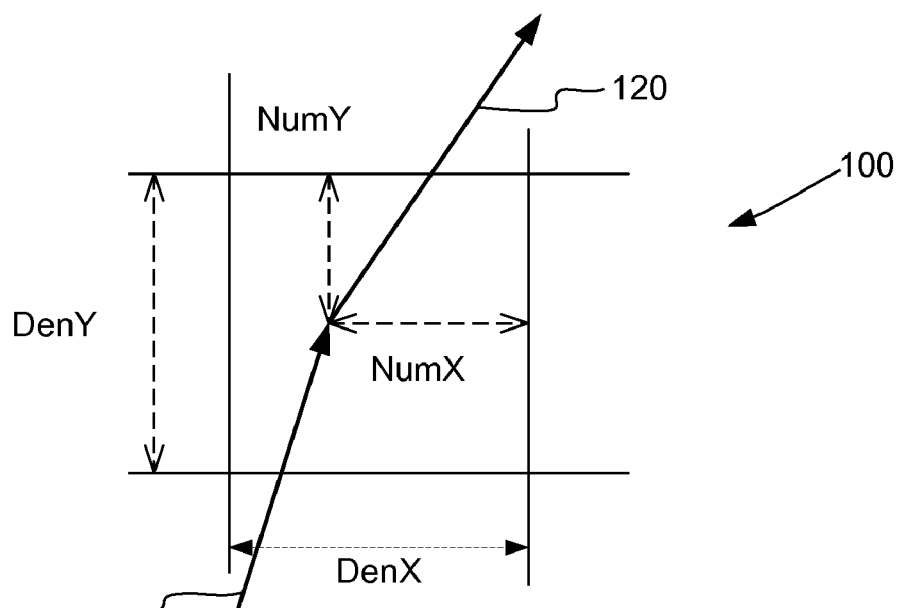
FIGS. 1 and 2 are diagrams illustrating raytracing in a 2D space in accordance with an embodiment of the invention.

A method, an apparatus and a computer program product are disclosed for rendering a multi-dimensional digital image using raytracing in a multi-dimensional space, and in particular for setting up multi-dimensional digital differential analyzer (DDA) variables using multiplications only. In the following description, numerous specific details, including programming languages, and hardware description languages, are set forth. However, from this disclosure, it will be apparent to those skilled in the art that modifications and/or substitutions may be made without departing from the scope and spirit of the invention. In other circumstances, specific details may be omitted so as not to obscure the invention.

In the embodiments of the invention, multi-dimensional Digital Differential Analyzer (DDA) variables are setup using multiplications only. Within the field of graphics, DDAs are commonly used to step through regularly spaced grids of data. A DDA can be any one of a number of algorithms that are used for analysis to model how to calculate successive points by adding to axis components (e.g., for the 2-D case, adding to the X or Y components). Notable applications include anti-aliasing line drawing algorithms (beyond Bresenham) in 2D and grid-based raytracing/raycasting in 3D. The algorithms may be used to draw lines, circles, ellipses, to name but a few applications.

The method for rendering a multi-dimensional digital image using raytracing in a multi-dimensional space, and in particular for setting up multi-dimensional digital differential analyzer (DDA) variables using multiplications only may be implemented in modules. A module, and in particular its functionality, can be implemented in either hardware or software. In the software sense, a module is a process, program, or portion thereof, that usually performs a particular function or related functions. Such software may be implemented in C, C++, ADA, Fortran, for example, but may be implemented in any of a number of other programming languages/systems, or combinations thereof. In the hardware sense, a module is a functional hardware unit designed for use with other components or modules. For example, a module may be implemented using discrete electronic components, or it can form a portion of an entire electronic circuit such as an Field Programmable Gate Arrays (FPGA), Application Specific Integrated Circuit (ASIC), and the like. A physical implementation may also include configuration data for a FPGA, or a layout for an ASIC, for example. Still further, the description of a physical implementation may be in EDIF netlisting language, structural VHDL, structural Verilog or the like. Numerous other possibilities exist. Those skilled in the art will appreciate that the system can also be implemented as a combination of hardware and software modules.

Setting Up Variables of Multi-Dimensional DDA Algorithm

In the embodiments of the invention, the DDA variables (numerators and denominators) can be setup without the conventional use of a division operator, removing operators in the 2D case and replacing the operators with a multiplication in the 3D case. In software, this results in a direct improvement in speed and in hardware yields a reduced gate count and a reduced need for pipelining due to reduced gate-depth/operation.

The setup for a DDA typically involves, for each axis, maintaining a "numerator" holding the progress within the cell along that axis and a "denominator" describing the size condition that causes the DDA algorithm to step to the "next" cell. Given a two-dimensional vector, V(A,B), the typical initialization for the denominators is:

Denominator(V)=(C/A,C/B), where C is an arbitrary constant (often 1 in floating point implementations). The use of this denominator function involves divisions.

By noting that "C/A" by itself is irrelevant, but the ratio between C/A and C/B is relevant (for purposes of the DDA algorithms execution), the need for division can be removed by:

C/A::C/B=>(C/A::C/B)*B=>B*C/A::B*C/B=>B*C/A::C $$B*C/A::C => (B*C/A::C)*A => A*B*C/A::$$
$$A*C => B*C::A*C$$

$$B*C::A*C => (B*C::A*C)/C => B::A \quad (1)$$

In other words, the denominator variables can be initialized by taking the multiplications of all the other axes participating in the vector. Thus, for vector V(A,B), Denominator(V)=(B, A).

For any multi-dimensional vector, the DDA denominators can be setup as follows:

Denominator(V) for any axis Q =Multiplication of all vector components, excluding the component of axis Q. (2)

In other words, in the 2D case:

Denominator(V) for X =Multiplication of Y with nothing;

=>just Y component itself.

In the 3D case:

Denominator(V) for X =Multiplication of Y with Z.

In the 4D case:

Denominator(V) for X =Multiplication of Y with Z and W, and so on.

The foregoing expressions show the case where the X axis is involved. It will be apparent to those skilled in the art in the light of this disclosure that the same is readily modifiable for the Y axis, and other axes, the details of which are not repeated here to avoid a repetitive description. The shortened representation of Denominator(V) for X is DenX or DX as used hereinafter. Similarly, Denominator(V) for Y is DenY or DY, and so on as appropriate.

Multi-Dimensional DDA Algorithm

FIG. 3 is a pseudocode listing illustrating a multi-dimensional DDA algorithm 300 in accordance with an embodiment of the invention. In the pseudocode, the direction of a ray is represented by a Vector V, denoted 120 in FIGS. 1 and 2. The origin of the ray is represented by a Vector B, denoted 110 in FIG. 1. The coordinates of the cell that is started with in are Trunc(B·S) for all axes S. An alternative expression for "cell" here is "voxel"; the terms may be used interchangeably in this context.

In the pseudocode 300, Fract( ) is a function that returns the fractional part of a floating point number, e.g., Fract(2.3)=0.3. For negative numbers, this function returns the fraction as measured from the next lower negative number, e.g., Fract(−2.3)=0.7. In the pseudocode 300, Trunc( ) is a function that truncates a floating point number into its lower integer, e.g. Trunc(2.3)=2. For negative numbers, Trunc( ) returns the next lower integer, e.g., Trunc(−2.3)=−3.

The portion of the pseudocode 300 that implements an embodiment of the invention is denoted by reference numeral 310, which sets up the multi-dimensional DDA variables using multiplications only. For all axes Q, the DDA denominators can be setup in the manner of Equation (2) where the denominator (DenQ in FIG. 3) for the vector V for any axis Q is equal to the multiplication of the deltas (e.g., x-delta, y-delta, . . . ) of all vector components, excluding the component of axis Q. Again 'Delta' is the absolute value of a vector's coordinate, e.g., the x-delta of a vector is the absolute x-coordinate (e.g. made positive if negative). The expressions x-delta, y-delta, . . . , have this meaning throughout this disclosure. If the vector V is positive along the current axis Q, the numerator (NumQ) for the axis Q is equal to the product of the denominator DenQ and the value of (1−Fract(B·Q)), where B·Q is the dot product of the vector B and the current axis Q. Otherwise, if the vector V is negative along the current axis Q, the numerator (NumQ) is equal to the product of the denominator DenQ and Fract(B·Q). In the foregoing manner, a value of the numerator NumQ is determined for each axis Q using the corresponding denominator DenQ, determined using multiplications only of axes other than Q. This completes initialization of processing of the vector V for all axes Q, each have NumQ and DenQ values. Thus, the pseudocode portion 310 sets up the numerators and denominators in anticipation of the remainder of pseudocode 300. The portion 310 ensures that denominators are set up correctly, such that the DDA processing run operates correctly. Furthermore, by setting up the numerators, the portion 310 ensures that the DDA processing run starts from exactly the right location.

The remainder of the pseudocode 300 implements DDA processing to step into an adjacent cell(s), which the processing does continuously (i.e., traces the actual vector in 3D space through the voxels). The axis Q having smallest numerator NumQ of all axes is determined. Using this axis Q, for all axes R where R is not the noted axis Q, a numerator NumR is computed for each respective axis which is the difference between the original value of the axis's numerator NumR and the smallest numerator NumQ. The numerator of Q (NumQ) is then set equal to the denominator of Q (DenQ). The algorithm then performs a unit step on the Q axis into the cell adjacent to the current one, in the direction of V·Q. The goal of the pseudo-code is to travel through all the cells intersected by the vector V. The operation that is performed once the next cell is known (at the "Perform step into adjacent cell" part) is not relevant for this algorithm, but specific to the purpose of employing this algorithm (e.g., for raytracing, the step typically includes performing ray<->primitive intersections for all primitives that intersect the same cell entered).

One case that is not fully set forth in the pseudo-code involves the circumstance of one of the vector's coordinates being 0 (or sufficiently close to 0 as to be treated as zero, a threshold commonly referred to as 'epsilon'). The DDA algorithm degenerates into its lower dimension form. To give an example, for a 3D vector, if one of the vector's coordinates is 0, the vector is parallel to the plane of the axis corresponding to the coordinate. In that case, processing of the pseudocode degenerates into a 2D DDA execution, whereby the axis with the 0 coordinate is left out from future consideration. This behavior 'cascades', e.g., a 4D case may degenerate into a 3D case which may degenerate into a 2D case which may degenerate into a 1D case. This is crucial since, if this is not done, in the 3D case, the other two axes would have 0 as their denominator.

Two-Dimensional Instantiation of DDA Algorithm

FIG. 5 illustrates a pseudocode listing 500 for an instantiation of the 2D case, but can extend into the 3D case. For the sake of brevity a description of parameters and functions in this listing 500 is not repeated, as such a description is given in the pseudocode 300. This example for the two-dimensional case is described with reference to FIGS. 1 and 2.

The multi-dimensional DDA variables DenX and DenY are setup using multiplications only using Equation (2). If the vector V is positive along the axis X, the numerator (NumX) is initially equal to the product of DenX and the value of (1−Fract(B·X)). Otherwise, if the vector V is negative along the axis X, NumX is initially equal to the product of the denominator DenX and Fract(B·X). NumY is determined initially in a similar manner. This completes initialization of processing of the vector V for all axes X and Y. In the example 100 of FIG. 1, NumX is equal to (1−Fract(B·X))*DenX and NumY is equal to (1−Fract(B·Y))*DenY. Thus, values for NumX, DenX, NumY, and DenY are determined. Here, NumY is less than NumX.

The remainder of the pseudocode 500 implements DDA processing to step into an adjacent cell. If NumX is less than NumY, the numerator NumY is NumY minus NumX, and NumX is then set equal to DenX. The algorithm then steps into the next horizontal cell if V·X is positive, or the previous horizontal cell if V·X is negative. Otherwise, the numerator NumX is NumX minus NumY, and NumY is then set equal to DenY. The algorithm then steps into the next vertical cell if V·Y is positive, or the previous vertical cell if V·Y is negative.

Figure 2:
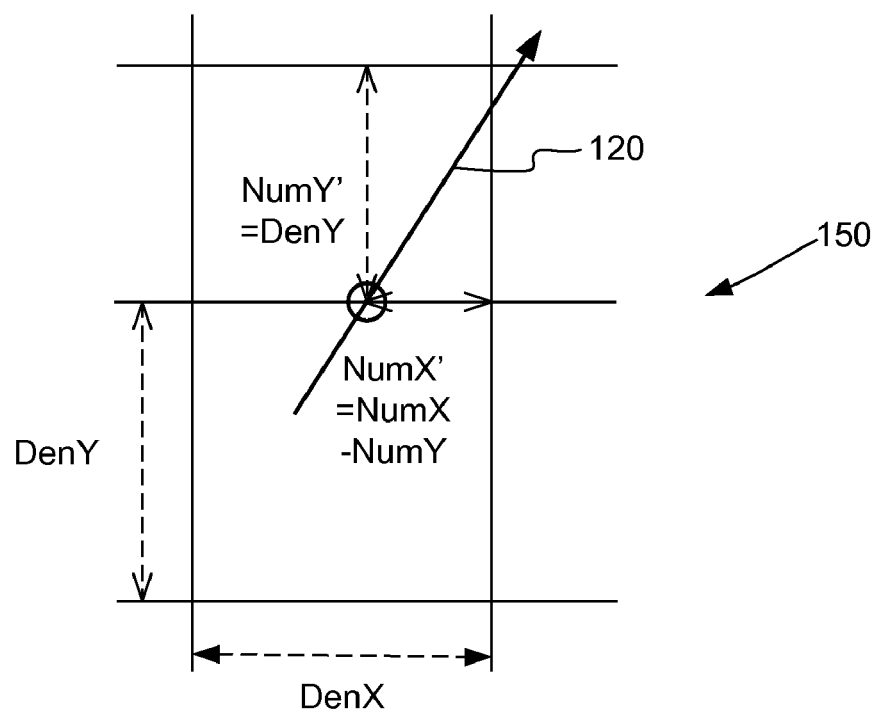

In the example 150 of FIG. 2, the next step using the foregoing processing is carried out based on the example of FIG. 1. This process is performed iteratively until the entire vector V has been processed. In this diagram, the Y axis is chosen as the axis having the smallest numerator. Thus, the new numerator value NumX' is equal to NumX minus NumY. The numerator of the Y axis, NumY', is set equal to the denominator DenY. Processing then continues in this manner in the "While (forever)" loop in FIG. 3 until the entire ray is processed. The algorithm then steps into the next vertical cell (V·Y is positive).

Computer Implementation

Figure 4:
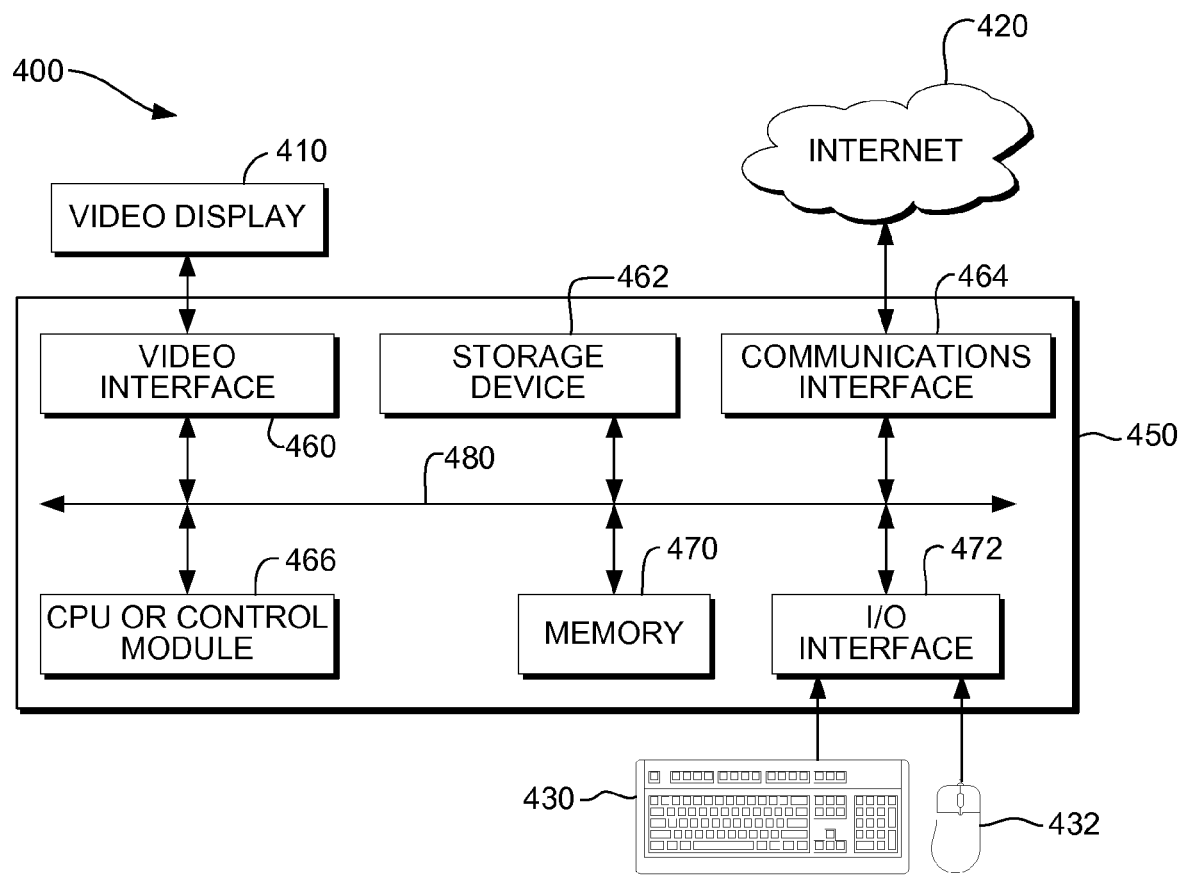
FIG. 4 is a block diagram of a general purpose computer system with which embodiments of the invention may be practiced.

The embodiments of the invention may be implemented using a computer. In particular, the processing or functionality described above and depicted in FIGS. 1-3 and 5 can be implemented as software, or a computer program, executing on the computer. The method or process steps disclosed for setting up a multi-dimensional digital differential analyzer (DDA) variables using multiplications only are effected by instructions in the software that are carried out by the computer. The software may be implemented as one or more modules for implementing the process steps. A module is a part of a computer program that usually performs a particular function or related functions. Also, a module can also be a packaged functional hardware unit for use with other components or modules. An example of a computer system 400 with which the embodiments of the invention may be practiced is depicted in FIG. 4.

In particular, the software may be stored in a computer readable medium, including the storage devices described hereinafter. The software is preferably loaded into the computer from the computer readable medium and then carried out by the computer. A computer program product includes a computer readable medium having such software or a computer program recorded on the medium that can be carried out by a computer. The use of the computer program product in the computer preferably effects an advantageous apparatus for setting up a multi-dimensional digital differential analyzer (DDA) variables using multiplications only in accordance with the embodiments of the invention.

The computer system 400 may include a computer 450, a video display 410, and input devices 430, 432. For example, an operator can use a keyboard 430 and/or a pointing device such as the mouse 432 to provide input to the computer as the input devices. In addition, the computer system can have any of a number of other output devices including line printers, laser printers, plotters, and other reproduction devices connected to the computer. The computer system 400 can be connected to one or more other computers via a communication interface 464 using an appropriate communication channel 440 such as a modem communications path, a computer network, or the like. The computer network may include a local area network (LAN), a wide area network (WAN), an Intranet, and/or the Internet 420.

The computer 450 may include a central processing unit(s) 466 (simply referred to as a processor hereinafter), a memory 470 which may include random access memory (RAM) and read-only memory (ROM), input/output (IO) interfaces 472, a video interface 460, and one or more storage devices 462. The storage device(s) 462 may include one or more of the following: a floppy disc, a hard disc drive, a magneto-optical disc drive, CD-ROM, DVD, magnetic tape or any other of a number of non-volatile storage devices well known to those skilled in the art. Each of the components of the computer 450 is typically connected to one or more of the other devices via a bus 480 that in turn can consist of data, address, and control buses.

The computer system 400 is simply provided for illustrative purposes and other configurations can be employed without departing from the scope and spirit of the invention. Computers with which the embodiment can be practiced include IBM-PC/ATs or compatibles, one of the Macintosh™ family of PCs, Sun Sparcstation™, a workstation or the like. The foregoing are merely examples of the types of computers with which the embodiments of the invention may be practiced. Typically, the processes of the embodiments, described hereinafter, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely an example of relevant computer readable mediums. Other computer readable mediums may be practiced without departing from the scope and spirit of the invention.

In the foregoing manner, a method, an apparatus, and a computer program product for rendering a multi-dimensional digital image using raytracing in a multi-dimensional space, and in particular for setting up a multi-dimensional digital differential analyzer (DDA) variables using multiplications only, are described. While only a small number of embodiments are described, it will be apparent to those skilled in the art in view of this disclosure that numerous changes and/or substitutions can be made without departing from the scope and spirit of the invention.

What is claimed is:

1. An apparatus for rendering a multi-dimensional digital image using raytracing in a multi-dimensional space, said apparatus comprising:

a multi-dimensional digital differential analyzer (DDA);

means for setting up variables of said multi-dimensional digital differential analyzer (DDA) using multiplications only, each axis of said multi-dimensional space including:

a numerator holding the progress within a cell along that axis; and a denominator describing a size condition causing said DDA to step to a next cell; and means for rendering the digital image based upon the variables of the multi-dimensional digital differential analyzer (DDA).

2. The apparatus according to claim 1, wherein for a vector, a denominator of said vector for an axis is equal to:
   a delta for a vector component, excluding the component of said axis, for two dimensions; and
   a product of deltas for all vector components, excluding the component of said axis, for greater than two dimensions.

3. The apparatus according to claim 2, wherein said multi-dimensional space is two dimensional (2D) space and said denominators are:

DenX=y-delta, and

DenY=x-delta.

4. The apparatus according to claim 2, wherein said multi-dimensional space is three dimensional (3D) space and said denominators are:

Den$X$=$y$-delta*$z$-delta,

Den$Y$=$x$-delta*$z$-delta, and

Den$Z$=$x$-delta*$y$-delta.

5. The apparatus according to claim 2, further including means for, for a vector V, initializing a numerator of said vector V for an axis Q equal to:

(1−Fract(B·Q))*DenQ, if the vector V is positive along the Q axis; and

Fract(B·Q)*DenQ, otherwise.

6. The apparatus according to claim 5, further comprising means for tracing said vector dependent upon said initial values of said numerators and denominators for all axes of said vector.

7. The apparatus according to claim 6, wherein said tracing means comprises:
   means for determining an axis having a numerator that is smallest for all axes;
   means for, for all axes other than the determined axis, calculating a new numerator value for each of said axes equal to a current value of said numerator minus the numerator of said determined axis;
   means for setting the numerator of said determined axis equal to the denominator of said determined axis; and
   means for stepping into a cell adjacent to said cell on said determined axis, in the direction of the dot product of said vector and said determined axis,
   wherein the foregoing means are repeatedly applied until said vector is traced.

8. A computer readable medium encoded with a computer program for rendering a multi-dimensional digital image using raytracing in a multi-dimensional space, said computer program product when executed:
   sets up variables of a multi-dimensional digital differential analyzer (DDA) using multiplications only, each axis of said multi-dimensional space including:
      a numerator holding the progress within a cell along that axis; and
      a denominator describing a size condition causing said DDA to step to a next cell; and
   renders the digital image based upon the variables of the multi-dimensional digital differential analyzer (DDA).

9. The computer readable medium according to claim 8, wherein for a vector, a denominator of said vector for an axis is equal to:
   a delta for a vector component, excluding the component of said axis, for two dimensions; and
   a product of deltas for all vector components, excluding the component of said axis, for greater than two dimensions.

10. The computer readable medium according to claim 9, wherein said multi-dimensional space is two dimensional (2D) space and said denominators are:

DenX=y-delta, and

DenY=x-delta.

11. The computer readable medium according to claim 9, wherein said multi-dimensional space is three dimensional (3D) space and said denominators are:

Den$X$=$y$-delta*$z$-delta,

Den$Y$=$x$-delta*$z$-delta, and

Den$Z$=$x$-delta*$y$-delta.

12. The computer readable medium according to claim 9, further including computer program code means for, for a vector V, initializing a numerator of said vector V for an axis Q equal to:

(1−Fract(B·Q))*DenQ, if the vector V is positive along the Q axis; and

Fract(B·Q)*DenQ, otherwise.

13. The computer readable medium according to claim 12, wherein said computer program product further traces said vector dependent upon said initial values of said numerators and denominators for all axes of said vector.

14. The computer readable medium according to claim 13, wherein traces said vector comprises the steps of:
    determining an axis having a numerator that is smallest for all axes;
    for all axes other than the determined axis, calculating a new numerator value for each of said axes equal to a current value of said numerator minus the numerator of said determined axis;
    setting the numerator of said determined axis equal to the denominator of said determined axis; and
    stepping into a cell adjacent to said cell on said determined axis, in the direction of the dot product of said vector and said determined axis;
    wherein the foregoing steps are repeatedly applied until said vector is traced.

* * * * *